US010200547B2

(12) United States Patent
Tachibana

(10) Patent No.: US 10,200,547 B2
(45) Date of Patent: Feb. 5, 2019

(54) IMAGE READING APPARATUS AND METHOD FOR CONTROLLING IMAGE READING APPARATUS

(71) Applicant: CANON KABUSHIKI KAISHA, Tokyo (JP)

(72) Inventor: Yoshiro Tachibana, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/201,037

(22) Filed: Jul. 1, 2016

(65) Prior Publication Data

US 2017/0013140 A1 Jan. 12, 2017

(30) Foreign Application Priority Data

Jul. 6, 2015 (JP) .................................. 2015-135678

(51) Int. Cl.
| | |
|---|---|
| *H04N 1/00* | (2006.01) |
| *G06K 15/02* | (2006.01) |
| *G06F 3/12* | (2006.01) |
| *B65H 7/12* | (2006.01) |
| *H04N 1/32* | (2006.01) |

(52) U.S. Cl.
CPC ..... *H04N 1/00037* (2013.01); *H04N 1/00013* (2013.01); *H04N 1/00076* (2013.01); *H04N 1/3263* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,763,162 | A * | 8/1988 | Yagasaki ............ | G03G 15/6511 271/263 |
| 5,087,027 | A * | 2/1992 | Acquaviva ............. | G03G 15/60 271/165 |
| 5,599,011 | A * | 2/1997 | Schnorr ................. | B65H 3/063 271/10.11 |
| 5,602,625 | A * | 2/1997 | Okamoto ............... | G03G 15/55 399/21 |
| 5,911,092 | A * | 6/1999 | Hotta ..................... | G03G 15/70 399/21 |
| 6,712,464 | B1 * | 3/2004 | Minami ............... | H04N 1/0461 347/107 |
| 9,908,726 | B2 * | 3/2018 | Mutsuno .............. | G03G 15/553 |
| 2002/0126309 | A1 * | 9/2002 | Shimada .............. | G03G 15/655 358/1.14 |
| 2003/0190169 | A1 * | 10/2003 | Shibaki .............. | G03G 15/6567 399/21 |

(Continued)

FOREIGN PATENT DOCUMENTS

| | | |
|---|---|---|
| CN | 101058374 A | 10/2007 |
| CN | 102692840 A | 9/2012 |

(Continued)

*Primary Examiner* — Beniyam Menberu
(74) *Attorney, Agent, or Firm* — Canon U.S.A., Inc. IP Division

(57) ABSTRACT

An image reading apparatus includes a document tray on which a plurality of documents is stacked, a feeding unit that feeds the documents on the document tray, a detection unit that detects a double feed of the documents fed by the feeding unit, and a notification unit that issues a notification prompting a user to loosen the documents when the detection unit detects the double feed.

24 Claims, 11 Drawing Sheets

(56) References Cited

U.S. PATENT DOCUMENTS

| | | | | |
|---|---|---|---|---|
| 2003/0230845 A1* | 12/2003 | Fujii | ...................... | B65H 39/11 271/176 |
| 2005/0012259 A1* | 1/2005 | Sano | ...................... | B65H 7/125 271/10.01 |
| 2005/0127597 A1* | 6/2005 | Sano | ...................... | B65H 7/125 271/258.01 |
| 2005/0140087 A1* | 6/2005 | Sano | ...................... | B65H 5/062 271/276 |
| 2007/0228639 A1* | 10/2007 | Matsumoto | .............. | B65H 1/14 271/97 |
| 2008/0174626 A1* | 7/2008 | Hirao | ................... | B41J 11/006 347/16 |
| 2010/0187753 A1* | 7/2010 | Suzuki | ..................... | B65H 7/02 271/265.02 |
| 2011/0156347 A1* | 6/2011 | Nakamura | ........... | B65H 3/0607 271/265.04 |
| 2012/0268771 A1* | 10/2012 | Kruizinga | .......... | H04N 1/00029 358/1.14 |
| 2013/0135646 A1* | 5/2013 | Akiyama | .................. | G06F 3/12 358/1.13 |
| 2013/0155448 A1* | 6/2013 | Link | .................. | H04N 1/00716 358/1.15 |
| 2013/0170003 A1* | 7/2013 | Yabuuchi | ............... | H04N 1/407 358/498 |
| 2014/0153937 A1* | 6/2014 | Unno | ..................... | G03G 15/70 399/21 |
| 2015/0048566 A1* | 2/2015 | Utagawa | .................. | B65H 1/14 271/10.02 |
| 2016/0185544 A1* | 6/2016 | Link | ..................... | B65H 43/04 271/265.02 |
| 2017/0113891 A1* | 4/2017 | Middleton | ............... | B65H 7/02 |

FOREIGN PATENT DOCUMENTS

| | | |
|---|---|---|
| CN | 103856663 A | 6/2014 |
| CN | 104081752 A | 10/2014 |
| CN | 104709742 A | 6/2015 |
| JP | 2008-271537 A | 11/2008 |

\* cited by examiner

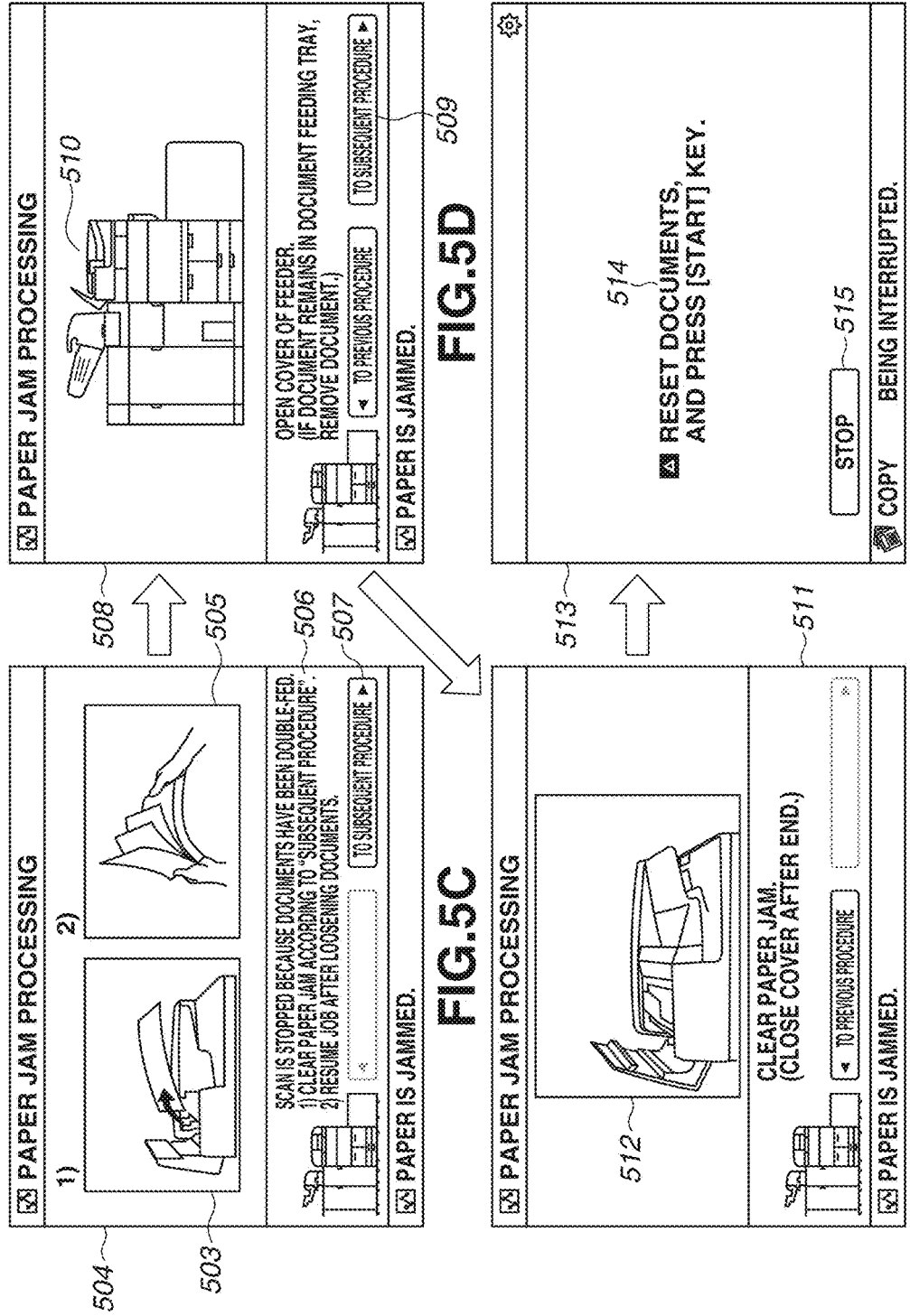

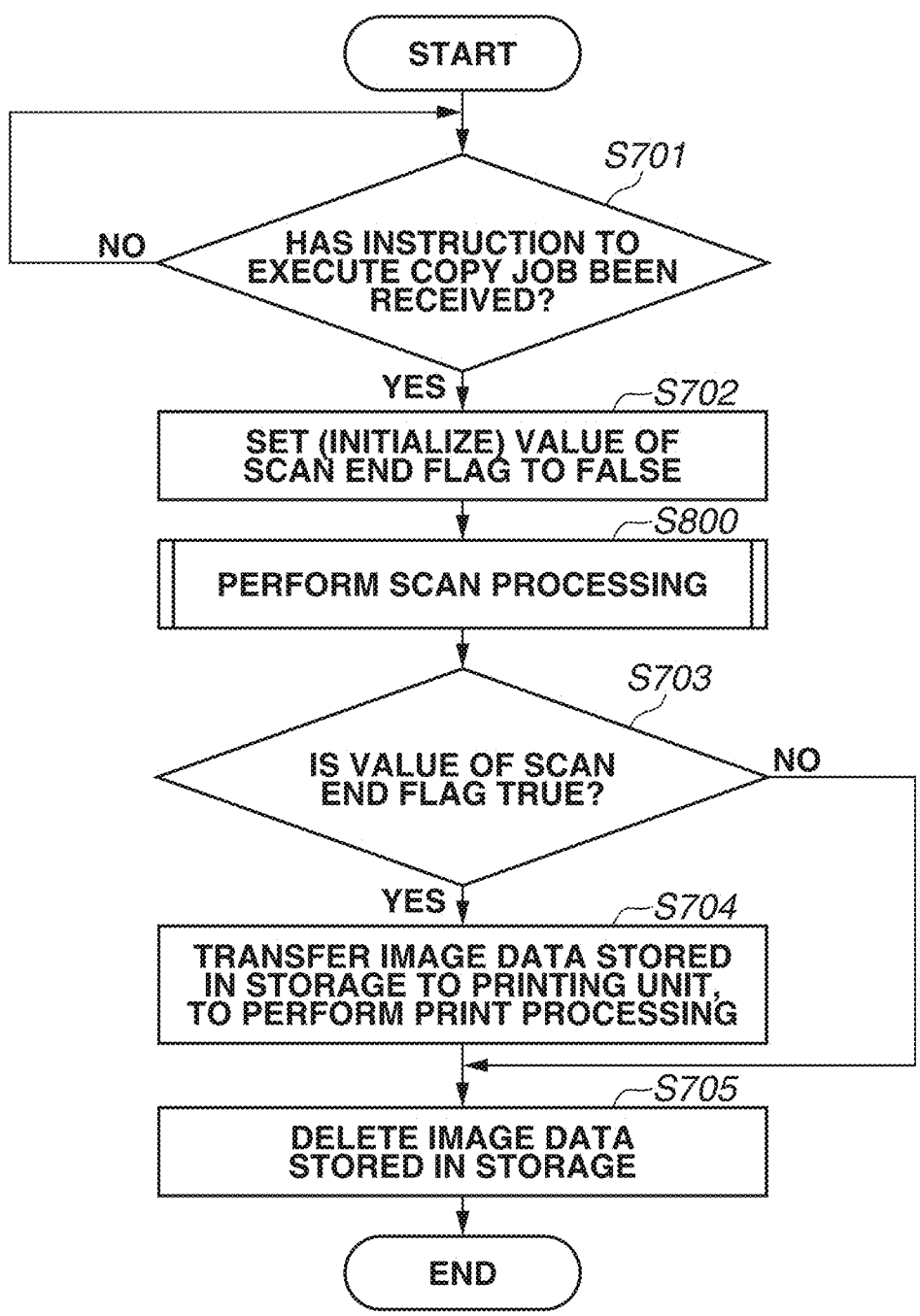

IMAGE READING APPARATUS AND METHOD FOR CONTROLLING IMAGE READING APPARATUS

BACKGROUND

Field

Aspects of the present invention generally relate to an image reading apparatus that detects a double feed of documents, and a method for controlling the image reading apparatus.

Description of the Related Art

Image reading apparatuses that convey a document to be read using an auto document feeder (ADF) and read an image on the document, and generate image data based on the read data are known. Image reading apparatuses that detect the occurrence of a double feed of documents using a double feed detection sensor, such as an ultrasonic sensor, is also known (Japanese Patent Application Laid-Open No. 2008-271537).

Japanese Patent Application Laid-Open No. 2008-271537 discusses stopping conveyance of the documents upon detection of the double feed of the documents by the double feed detection sensor. Japanese Patent Application Laid-Open No. 2008-271537 discusses notifying a user of the occurrence of a double feed of the documents and prompting the user to select whether reading of an image on the document should resume or stop.

When a user receives notification of the double feed occurrence, resets the double-fed documents on a document stacking unit without loosening the double-fed documents, and starts rereading the documents, the user risks re-occurrence of the double feed during the rereading.

SUMMARY

Aspects of the present invention are directed to a technique capable of suppressing, when a double feed has occurred, the reoccurrence of the double feed.

According to an aspect of the present invention, an image reading apparatus includes a document tray on which a plurality of documents is stacked, a feeding unit configured to feed the documents on the document tray, a detection unit configured to detect a double feed of the documents fed by the feeding unit, and a notification unit configured to issue a notification prompting a user to loosen the documents when the detection unit detects the double feed.

Further features of aspects of the present invention will become apparent from the following description of exemplary embodiments with reference to the attached drawings.

BRIEF DESCRIPTION OF THE DRAWINGS

FIGS. 5A, 5B, 5C, and 5D each illustrate an operation screen displayed on a panel 401.

FIG. 7 is a flowchart illustrating a control method for controlling execution of copying.

DESCRIPTION OF THE EMBODIMENTS

Exemplary embodiments of the present invention are described below with reference to the drawings. The following exemplary embodiments are not intended to limit the aspects of the invention according to the scope of the claims, and all combinations of features described in the exemplary embodiments are not necessarily essential for implementing the aspects of the invention.

A first exemplary embodiment of the present invention will now be described. In the first exemplary embodiment, a job for reading a document is executed. While the job is being executed, scanning is suspended upon detecting a double feed of documents by a double feed detection sensor. Control to issue a notification prompting a user to loosen the documents in response to the detection of the double feed will be described.

Figure 1:
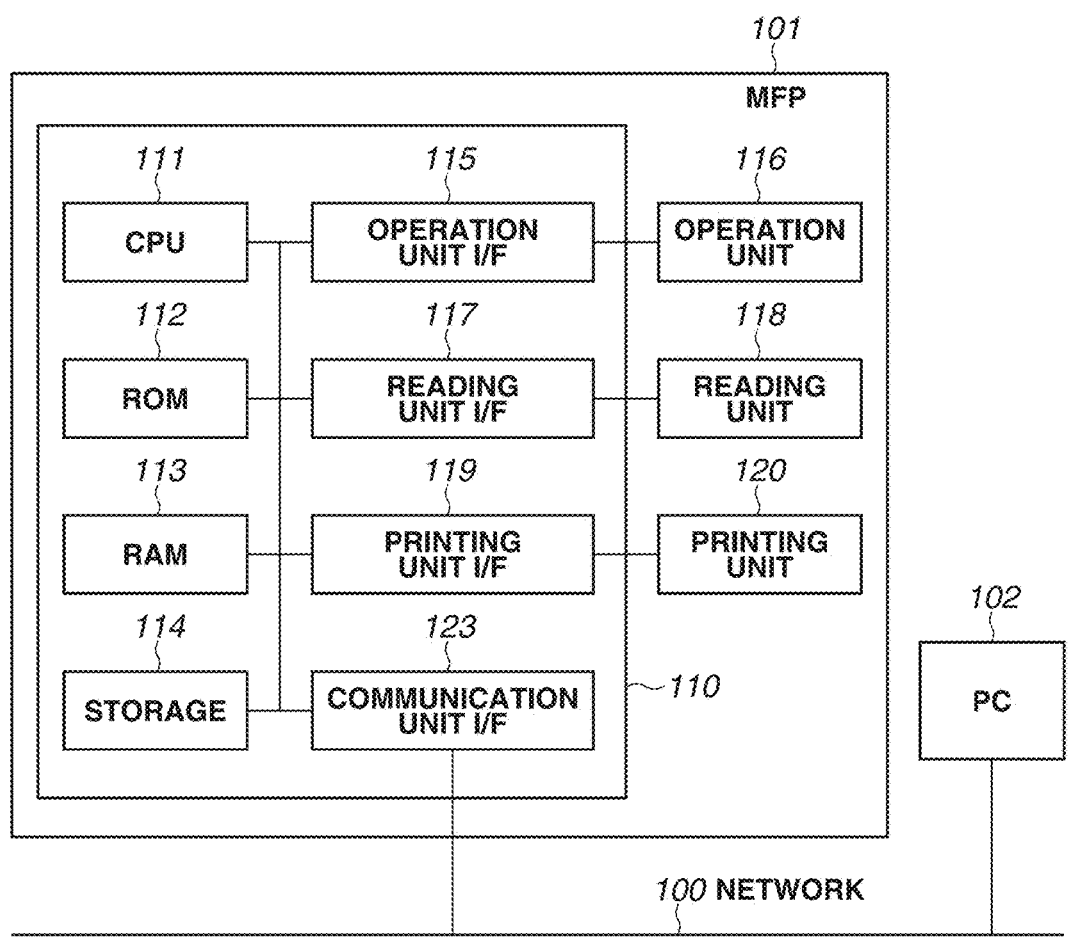
FIG. 1 is a block diagram illustrating an image reading system.

FIG. 1 is a block diagram illustrating an image reading system according to the present exemplary embodiment. In the present exemplary embodiment, a multifunction peripheral (MFP) 101 and a personal computer (PC) 102 will be respectively described as an example of an image reading apparatus and an example of an information processing apparatus. The MFP 101 and the PC 102 communicate with each other via a network 100.

While an example of a configuration in which one information processing apparatus is provided in the image reading system is illustrated in FIG. 1, the MFP 101 and a plurality of information processing apparatuses can communicate with each other via the network 100. While an example of a configuration of the image reading system according to the present exemplary embodiment including the MFP 101 and the PC 102 is illustrated, aspects of the present invention are not limited thereto. For example, the MFP 101 itself can be referred to as an image reading system.

First, the PC 102 will be described. The PC 102 executes various types of programs such as an application program. A scanner driver that uses a reading function of the MFP 101 from the PC 102 and a scan application for processing and managing a scanned image are installed in the PC 102. The PC 102 uses the reading function of the MFP 101 by issuing a scan instruction to the MFP 101.

The MFP 101 will now be described. The MFP 101 includes a reading function that reads an image on a sheet and a printing function that prints the image on the sheet. The MFP 101 further includes a file transmission function that transmits image data to an external apparatus.

While the MFP 101 will be described as an example of the image reading apparatus in the present exemplary embodiment, aspects of the present invention are not limited thereto. The present exemplary embodiment is applicable to an image reading apparatus where the image reading apparatus includes a configuration where a document is conveyed to read an image on the document. For example, the image reading apparatus according to the present exemplary embodiment can be a scanner including a single function with no printing function. The image reading apparatus can store generated image data in an inner storage area. The image reading apparatus according to the present exemplary embodiment can be a scanner that stores the image data via an external bus such as a Universal Serial Bus (USB) in an external memory (e.g., a USB flash drive) detachably attached to the image reading apparatus. In the present exemplary embodiment, the image reading apparatus includes various types of components described below as an example.

A control unit 110 including a central processing unit (CPU) 111 controls the operation of the MFP 101. The CPU 111 reads out a control program stored in a read only memory (ROM) 112 or a storage 114 and performs various types of control, such as reading control and a printing control. The ROM 112 stores a control program that is executable by the CPU 111. A random access memory (RAM) 113 is a main storage memory for the CPU 111, and is used as a temporary storage area for loading various types of control programs stored in a work area, the ROM 112, and the storage 114. The storage 114 stores print data, image data, various types of programs, and various types of setting information. While the storage 114 in the present exemplary embodiment is an auxiliary storage device, such as a hard disk drive (HDD), in another exemplary embodiment, the HDD can be replaced with a nonvolatile memory such as a solid state drive (SSD).

While the present exemplary embodiment refers to CPU 111 performing processes of the flowcharts described below using one memory (the RAM 113), the MFP 101 can have other configurations in other exemplary embodiments. For example, a plurality of CPUs, RAMs, ROMs, and storage devices can corporate with one another to execute the processes in the below-described flowcharts. A hardware circuit such as an application specific integrated circuit (ASIC) or a field-programmable gate array (FPGA) can perform some of the processes.

Figure 4:
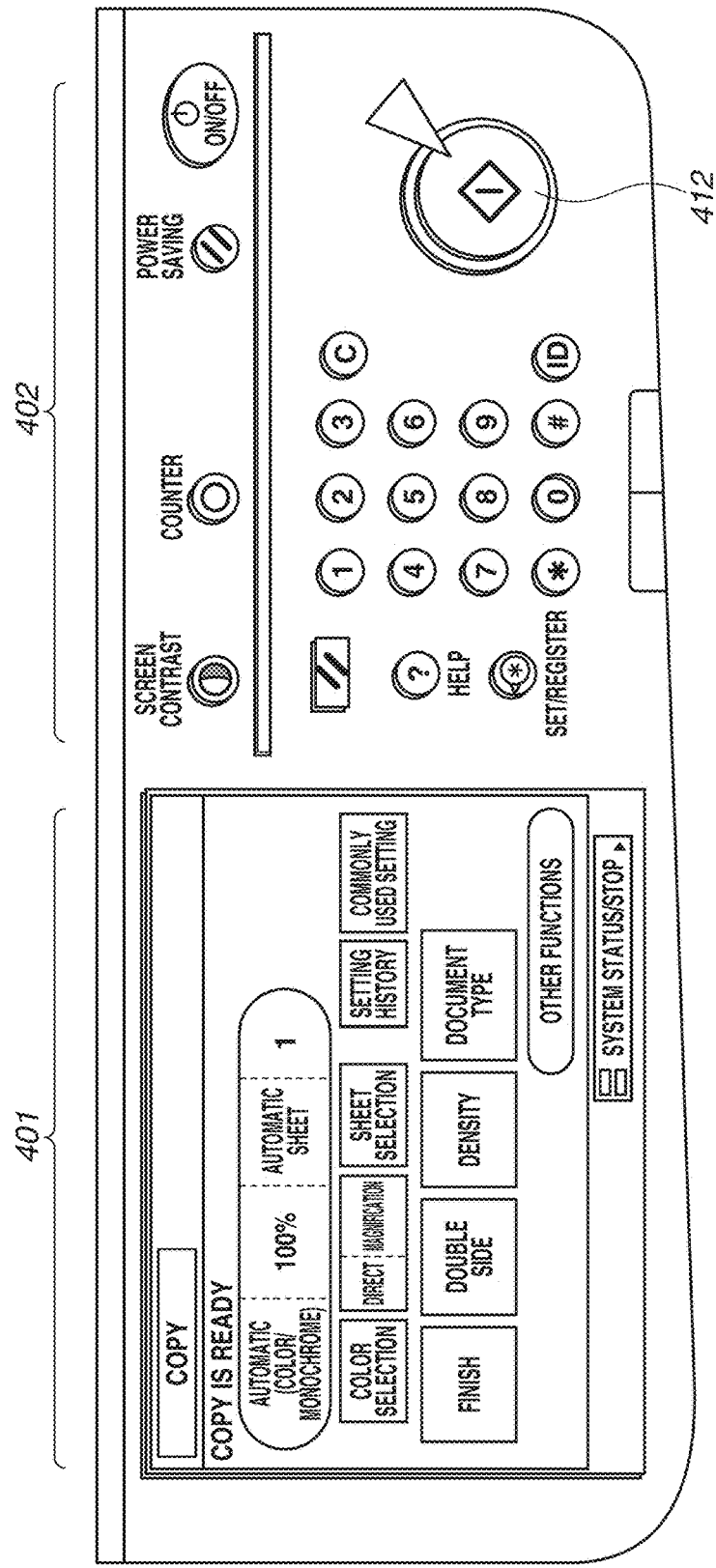
FIG. 4 is an external view of an operation unit.

An operation unit interface (I/F) 115 connects an operation unit 116 and the control unit 110. FIG. 4 is an external view of the operation unit 116. The operation unit 116 includes a panel 401 on which an operation screen (described below) is displayed, and a hard key input unit 402. The panel 401 is a touch panel display, for example. The hard key input unit 402 includes various types of hard keys, such as a start key 412. The user inputs an instruction by touching a key displayed on the panel 401 or pressing a hard key provided on the hard key input unit 402. The panel 401 can be a display having no touch panel function. In this case, the panel 401 can include a scroll key for selecting a key to be displayed on the display and a determination key for determining the key, respectively, as the hard keys. The operation unit 116 functions as a reception unit that receives an instruction from the user via the panel 401 and the hard key input unit 402, or functions as a display unit that displays an operation screen on the panel 401, as needed.

A reading unit interface (I/F) connects a reading unit 118 and the control unit 110. The reading unit 118 reads an image on a sheet and generates image data. The image data generated by the reading unit 118 is transmitted to the external apparatus or is printed on a sheet. A specific configuration of the reading unit 118 will be described below with reference to FIGS. 2 and 3.

A printing unit I/F 119 connects a printing unit 120 and the control unit 110. Image data to be printed is transferred to the printing unit 120 from the control unit 110 via the printing unit I/F 119. The printing unit 120 receives a control command and the image data to be printed via the control unit 110, and prints an image on a sheet based on the image data. A printing method of the printing unit 120 can be an electrophotographic method an inkjet method, or any other applicable printing method (e.g., a thermal transfer method).

The control unit 110 is connected to the network 100 via a communication unit I/F 123. The communication unit I/F 123 transmits image data and information to the external apparatus on the network 100 and receives print data and information from the information processing apparatus on the network 100.

<Configuration of Reading Unit>

Figure 2:
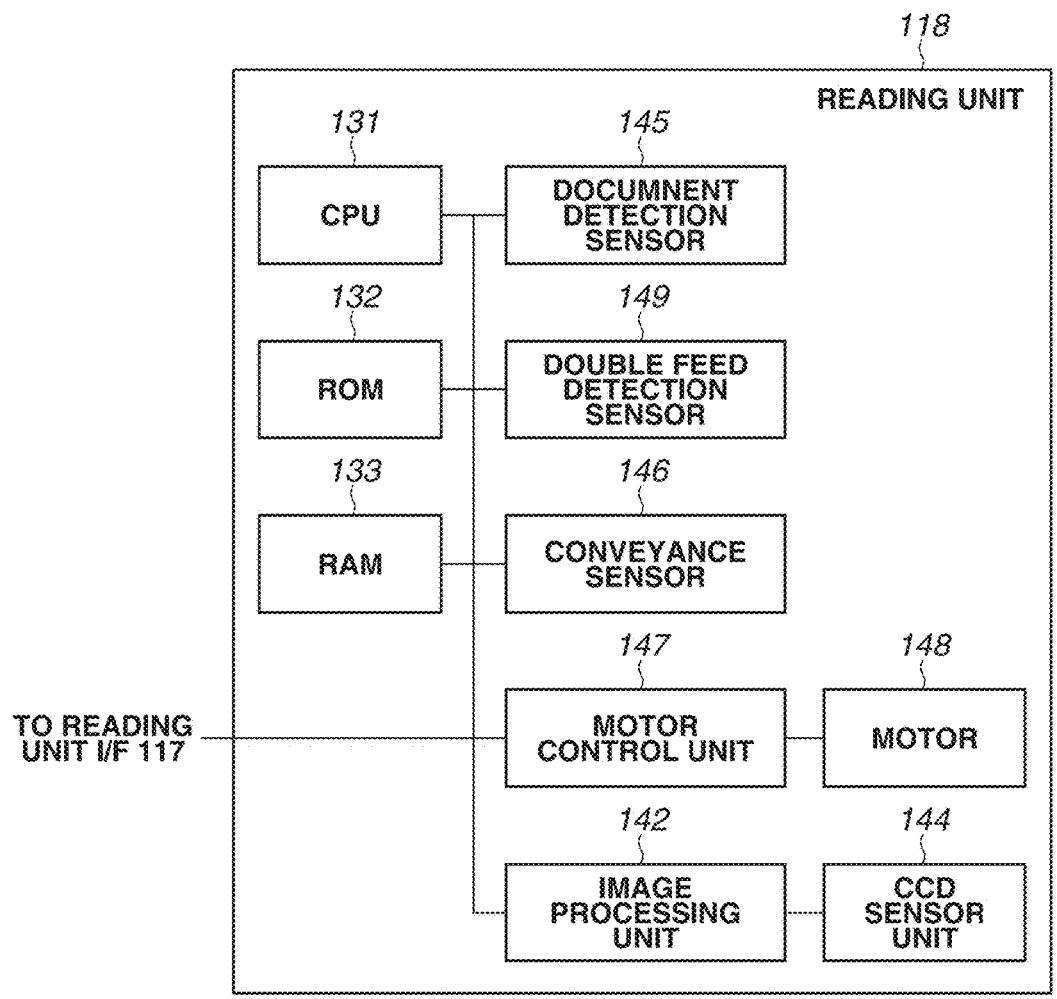
FIG. 2 is a block diagram illustrating a configuration of a reading unit.
Figure 3:
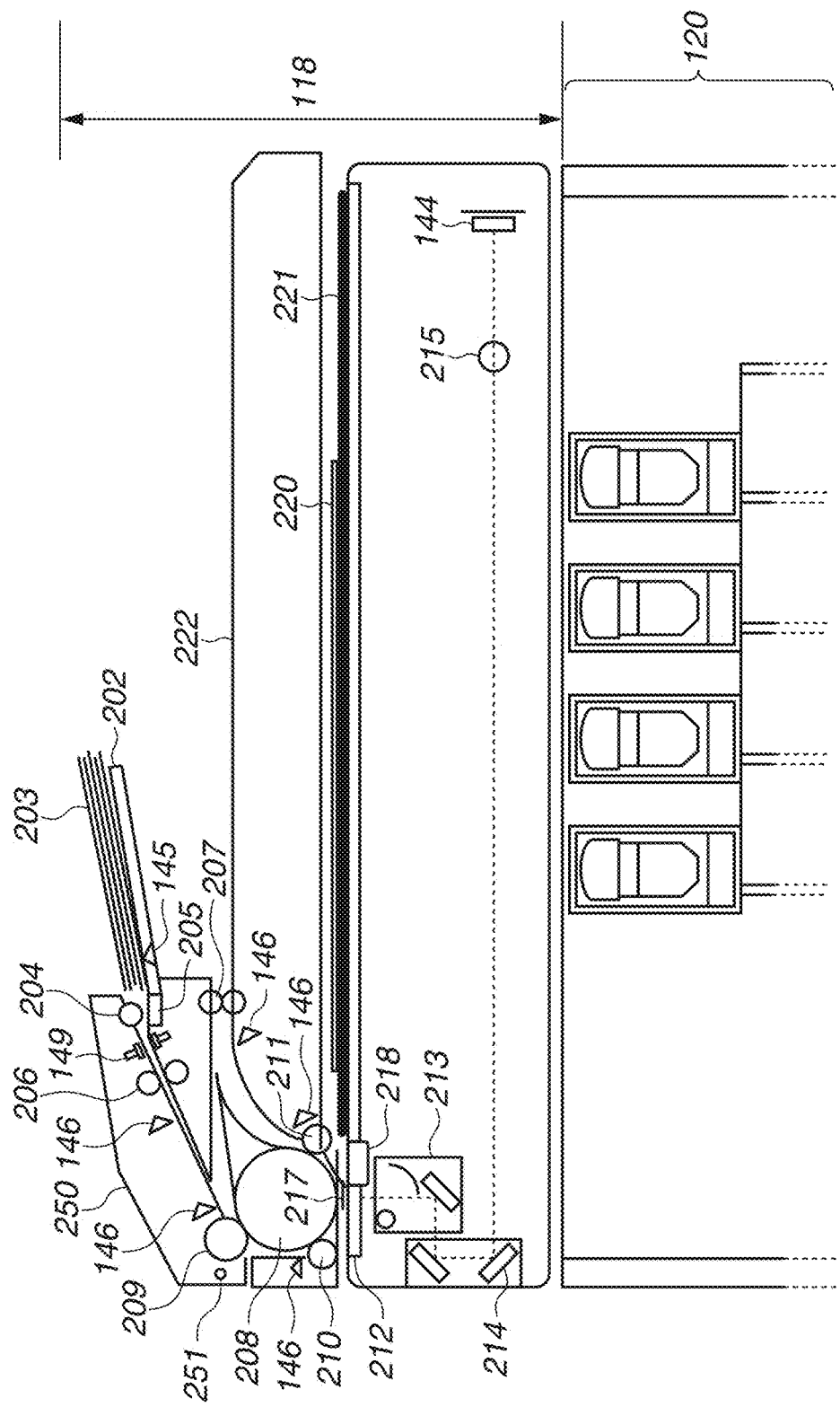
FIG. 3 is a cross-sectional view of the reading unit.

A hardware configuration of the reading unit 118 will be described below with reference to FIGS. 2 and 3. FIG. 2 is a block diagram illustrating a configuration relating to control of the reading unit 118. A CPU 131 controls an operation of the reading unit 118. The CPU 131 reads out a control program stored in a ROM 132, and performs various types of control such as reading control and information exchanging control with the control unit 110. The ROM 132 stores a control program that is executable by the CPU 131. A RAM 133 is a main storage memory for the CPU 131, and is used as a work memory and a temporary storage area for loading various types of control programs stored in the ROM 132. The CPU 131, the ROM 132, and the RAM 133 can be implemented by a micro controller having the same functions incorporated into one integrated circuit.

The reading unit 118 includes an image processing unit 142, a charge-coupled device (CCD) sensor unit 144, a document detection sensor 145, a motor control unit 147, a motor 148, and a double feed detection sensor 149, and a conveyance sensor 146. The reading unit 118 is connected to the control unit 110 via the reading unit I/F 117.

The document detection sensor 145 detects that documents 203 are stacked on a document stacking unit (document feeding tray) 202. A detection signal from the document detection sensor 145 is transmitted to the CPU 111 via the reading unit I/F 117.

The motor 148 is driven to rotate a document feeding roller 204, a conveyance roller 206, a large roller 208, a roller 209, a roller 210, a roller 211, and a document discharge roller pair 207, which are described below, in the reading unit 118. The motor 148 is driven to move an exposure unit 213 and a mirror unit 214, which are described below, in the reading unit 118.

While the CPU 111 controls the motor driving unit 147 to control the driving of the motor 148 in the present exemplary embodiment, aspects of the present invention are not limited thereto. The CPU 131 in the reading unit 118 can control the driving of the motor 148 by controlling the motor control unit 147.

The double feed detection sensor 149 detects the occurrence of a double feed of the documents 203. A detection signal by the double feed detection sensor 149 is transmitted to the CPU 111 via the reading unit I/F 117. Details of the double feed detection sensor 149 will be described below.

The conveyance sensor 146 includes a plurality of sensors respectively provided at important places of a document conveyance path, detects the occurrence of a conveyance error such as a jam, and the presence or absence of the document 203 in the conveyance path. When the conveyance sensor 146 detects the occurrence of the conveyance error, a maintenance screen and a guide screen (described below) are displayed on the operation unit 116.

Data read by the CCD sensor unit 144 is converted from an analog signal to a digital signal by an analog-to-digital (A/D) conversion unit (not illustrated). Then, the digital signal is converted into image data by the image processing unit 142, and is temporarily stored in the RAM 113 via the reading unit I/F 117. The image data is stored in the storage 114 under control of the CPU 111.

A case where an operation for reading an image on the document 203 (hereinafter, referred to as scanning) is performed by an ADF will be described below with reference to a cross section of the reading unit 118 illustrated in FIG. 3.

If the document detection sensor 145 detects that the document 203 are stacked on the document stacking unit 202, the scanning is started upon receipt of an instruction to execute scanning (hereinafter, referred to as scanning execution instruction) from the user.

The documents 203 stacked on the document stacking unit 202 are conveyed one by one by the document feeding roller 204 and a separation pad 205, which are paired with each other. The documents 203, which have been conveyed one by one, pass through the double feed detection sensor 149.

The double feed detection sensor 149 detects that a double feed of the documents 203 has occurred. Double feed refers to a state where two or more documents 203 are conveyed with at least some parts thereof overlapping each other.

In the present exemplary embodiment, the double feed detection sensor 149 uses a ultrasonic wave, where the ultrasonic wave is transmitted from an upper sensor and its change is sensed by a lower sensor. Occurrence of the double feed is determined based on a receiving intensity obtained when the one document 203 has been conveyed as a reference, in a case where the receiving intensity of a signal actually detected is lower than this reference receiving intensity.

While the sensor using the ultrasonic wave will be described as an example of the double feed detection sensor 149 in the present exemplary embodiment, an optical sensor can be used if a double feed is detectable therewith. Alternatively, the double feed detection sensor 149 measures the thickness of the document 203 and determines occurrence of a double feed of the documents 203 based on the measured data.

The document 203, which has passed through the double feed detection sensor 149, is fed into the apparatus by the conveyance roller 206. The document 203, which has been conveyed by the conveyance roller 206, is detected by a document passage detection sensor serving as one of the conveyance sensors 146. Determination whether the passage of the first document 203 has ended is based on a detection time.

The document 203, which has been fed into the apparatus by the conveyance roller 206, is conveyed by the large roller 208 and the roller 209, and is further conveyed by the larger roller 208 and the roller 210. The document 203, which has been conveyed after passing between a document glass 212 and a document guide plate 217 while contacting the document glass 212, is further conveyed by the large roller 208 and the roller 211 after passing over a guide plate 218, and is discharged onto a document discharge tray 222 by the document discharge roller pair 207. The CPU 111 rotates each of the rollers by driving the motor 148 to convey the document 203. A discharge sensor serving as one of the conveyance sensors 146 detects that the document 203 is discharged onto the discharge tray 222.

When the document 203 passes over the document glass 212, a surface of the document 203, which contacts the document glass 212, is exposed with light by the exposure unit 213 so that an image on the document 203 is read in a main scanning direction and a sub-scanning direction. Light reflected from the document 203 obtained as a result thereof is transmitted to the mirror unit 214 via a plurality of mirrors. The transmitted reflected light is collected after passing through the lens 215, and is converted into data of an electric signal by the CCD sensor unit 144. The data output from the CCD sensor unit 144 is converted into image data by the image processing unit 142, and is transferred to the control unit 110.

While an optical system provided in the reading unit 118 has been described as being a reducing optical system for forming an image of the reflected light from the document 203 on a CCD sensor in the present exemplary embodiment, aspects of the present invention are not limited thereto. The optical system provided in the reading unit 118 can be an equal-magnification optical system for forming an image of the reflected light from the document 203 on a contact image sensor (CIS).

While an operation for reading an image on the document 203 executed by the reading unit 118 has been described for a case where a position of the optical system is fixed and the image on the document 203 is read while the document 203 is conveyed by the ADF, aspects of the present invention are not limited thereto. The reading unit 118 can also read an image on a document 220 by conveying the document 220 to a platen glass 221 (a document positioning plate), then fixing a position of the document 220, and driving the motor 148 to move the optical system.

A cover 250 is a cover for covering a part of a conveyance path in the ADF. The cover 250 rotates around a support shaft 251, and is configured to be openable and closable. The user can perform work such as jam processing i.e., opening the cover 250 and removing the document 203 jammed in the conveyance path and the document 203 remaining stopped in the conveyance path. An opening/closing sensor (not illustrated) for detecting whether the cover 250 remains opened or closed can be provided.

A case where the document 203 has been jammed in the conveyance path (a document jam has occurred) and a case where a double feed has occurred are referred together as a conveyance error. If the document jam occurs, the user can pull the document 203 sandwiched between the roller 209 and the large roller 208 in an opposite direction to a conveyance direction to remove the document 203. The user can also convey and remove the document 203 using a knob (not illustrated) to manually rotate each of the rollers when a position of the document 203 is close to the discharge tray 222.

In the present exemplary embodiment, a maintenance screen for comprehensibly presenting to the user a method for removing the document 203 can be displayed on the panel 401. For example, the maintenance screen can present a method for opening the cover 250 and removing the document 203 or a method for removing the document 203 in the conveyance path to the user using an image or a moving image. Details of the maintenance screen will be described below.

<Processing Upon Detecting Double Feed>

When a double feed occurs while the reading unit 118 of the MFP 101 is conveying the documents 203, the plurality of overlapping documents 203 flows in the conveyance path. Therefore, a document jam can occur on the way. Even if a document jam does not occur, an image is read with the two documents 203 overlapping each other. Therefore, image data is generated with a part of the document 203 being defective.

In the present exemplary embodiment, control is performed to stop, when a double feed of the documents 203 occurs, conveying the overlapping documents 203 and to notify the user that the double feed has been detected. A method notifying the user that the documents 203 stacked on the document stacking unit 202 are to be loosened before resuming reading of an image on the document 203 and resuming the reading will be described below.

First, factors causing a double feed will be described. For example, an adhesive force between the documents 203, which have been stored for a long period of time, can be high due to, for example, static electricity. In another example, the adhesive force between the documents 203 might have increased due to the documents 203 being left in a high-humidity environment.

Thus, when the documents 203 adhere to one another, the document feeding roller 204 and the separation pad 205 cannot separate the plurality of documents 203 from one another, resulting in the plurality of documents 203 being fed in an overlapped state.

Therefore, adhesion among the documents 203 needs to be eliminated to suppress occurrence of the double feed. More specifically, loosening the documents 203 to release adhesion among the documents 203 by putting air between the documents 203 stacked on the document stacking unit 202 to create a clearance has proven to be useful.

Therefore, examples of information for suppressing the occurrence of the double feed include information indicating that documents 203 are to be loosened as described above and information indicating a way of loosening the documents 203 using an illustration.

When a large number of documents 203 are stacked on the document stacking unit 202, the documents 203 can adhere to one another due to their own weights. Even if the user loosens the documents 203, to eliminate the adhesion among the documents 203, if a large number of documents 203 are stacked on the document stacking unit 202, the documents 203 can adhere to one another due to their own weights. In view of this, information indicating that the number of the documents 203 to be stacked is to be reduced may be notified in addition to the information indicating that the documents 203 are to be loosened and the information indicating the way of loosening the documents 203 using an illustration.

If the double feed has been detected, the user opens the cover 250 to remove the documents 203 that are double-fed. Both the documents 203 that are double-fed, as well as the documents 203 that have been fed can be jammed in the conveyance path. A jam occurs when a document 203 gets stuck in the conveyance path when, for example, there is no double-fed documents 203. As used herein, a jam also refers to a document 203 downstream of double-fed documents 203 remaining stopped, but not stuck, in the conveyance path as a result of the control unit 111 stopping conveyance of the double-fed documents 203.

Therefore, in the present exemplary embodiment, when the double feed has been detected, information for suppressing the double feed and removal of the documents 203 by opening the cover 250, as well as a method for removing the documents 203 are presented to the user. For example, in the present exemplary embodiment, a screen displaying information for suppressing the reoccurrence of a double feed (hereinafter, referred to as a guide screen) and a maintenance screen are both displayed. An example of a specific method for displaying a screen will be described with reference to FIGS. 5A, 5B, 5C, and 5D.

FIGS. 5A, 5B, 5C, and 5D respectively illustrate examples of screens displayed on the panel 401 when the double feed detection sensor 149 in the reading unit 118 illustrated in FIG. 2 detects occurrence of a double feed.

FIG. 5A illustrates an example of a guide screen. FIGS. 5B and 5C respectively illustrate examples of maintenance screens. FIG. 5D illustrates an example of a screen waiting for rereading of documents.

The CPU 111 suspends conveyance of documents if the double feed detection sensor 149 detects occurrence of a double feed when documents are read in a copy function or a file transmission function. The CPU 111 displays a guide screen 504 illustrated in FIG. 5A on the panel 401.

Information 503 displayed on the guide screen 504 is information describing a method to a user for removing double-fed documents, and illustrates a guidance prompting the user to open the cover 250 and extract the double-fed documents. Information 505 is information describing to the user a way of loosening documents 203 stacked on the document stacking unit 202. More specifically, information 505 illustrates how the user should hold documents together, slightly warp the documents, and flip respective one ends of the documents to form a clearance between the documents. While the present exemplary embodiment provides a method of loosening documents is provided using the above-described illustration, aspects of the present invention are not limited thereto. The way of loosening documents can be described using animation or a moving image. Alternatively, the way of loosening documents can be described using character information.

Information 506 is information notifying the user that a double feed has occurred. More specifically, the information 506 notifies the user that documents need to be removed and that documents need to be loosened to suppress possible reoccurrence of the double feed. The information 506 illustrates that the processing can proceed to description of a method for removing documents by pressing a "to subsequent procedure" key 507.

The "to subsequent procedure" key 507 is a key for shifting to a screen on which the subsequent procedure is displayed.

When the CPU 111 detects that the "to subsequent procedure" key 507 has been pressed, the CPU 111 displays a cover open screen 508 illustrated in FIG. 5B on the panel 401. On the screen 508, a message is displayed indicating that the cover 250 of the reading unit 118 should be opened to facilitate removing documents that have remained the conveyance path. A region 510, which is a region where a maintenance method is displayed, is also included in the cover open screen 508. The CPU 111 presents a method for removing documents to the user by displaying an animation or a moving image for opening and closing the cover 250 in the region 510.

A "to subsequent procedure" key 509 is a key for shifting to a screen on which the subsequent procedure is displayed. The user can return the screen to the preceding screen by pressing a "to previous procedure" key.

When the CPU 111 detects that the "to subsequent procedure" key 509 has been pressed with the screen 508 being displayed, the CPU 111 displays a jam processing screen 511 illustrated in FIG. 5C on the panel 401. The CPU 111 displays the jam processing screen 511 when an opening/closing sensor (not illustrated) detects that the cover 250 has been opened.

A content of work for removing documents that have remained in the conveyance path is presented on the jam processing screen 511. A region 512 is a region where the method for removing the remained documents is displayed. To present the method for removing the remained documents to the user, the CPU 111 displays an illustration illustrating the method for removing the remained documents and displays a moving image for describing the method for removing the remained documents in the region 512. An illustration or a moving image indicating that the cover 250 is to be closed after the remained documents are removed is also displayed in the region 512.

The CPU 111 displays, when it determines that the reading unit 118 is in a state where an error can be released based on the conveyance sensor 146 and the opening/closing sensor, a rereading standby screen 513 illustrated in FIG. 5D on the panel 401. Information 514 is information notifying the user that the processing can be resumed when the user resets the documents 203 and presses the start key 412. The user can resume the reading of the documents 203 by pressing the start key 412. When the CPU 111 detects that the start key 412 has been pressed, the CPU 111 displays a screen for setting a copy function or a file transmission function displayed before the double feed occurs.

A stop key 515 is a key used when the copy function or the file transmission function, which is being executed, is stopped. The user can stop the processing, which is being executed, by pressing the stop key 515 to discard documents read so far. When the CPU 111 detects that the stop key 515 has been pressed, the CPU 111 displays a main screen (not illustrated) on the panel 401.

Specific control to display information for suppressing the reoccurrence of a double feed will be described below using the copy function of the MFP 101 as an example.

Figure 6A:
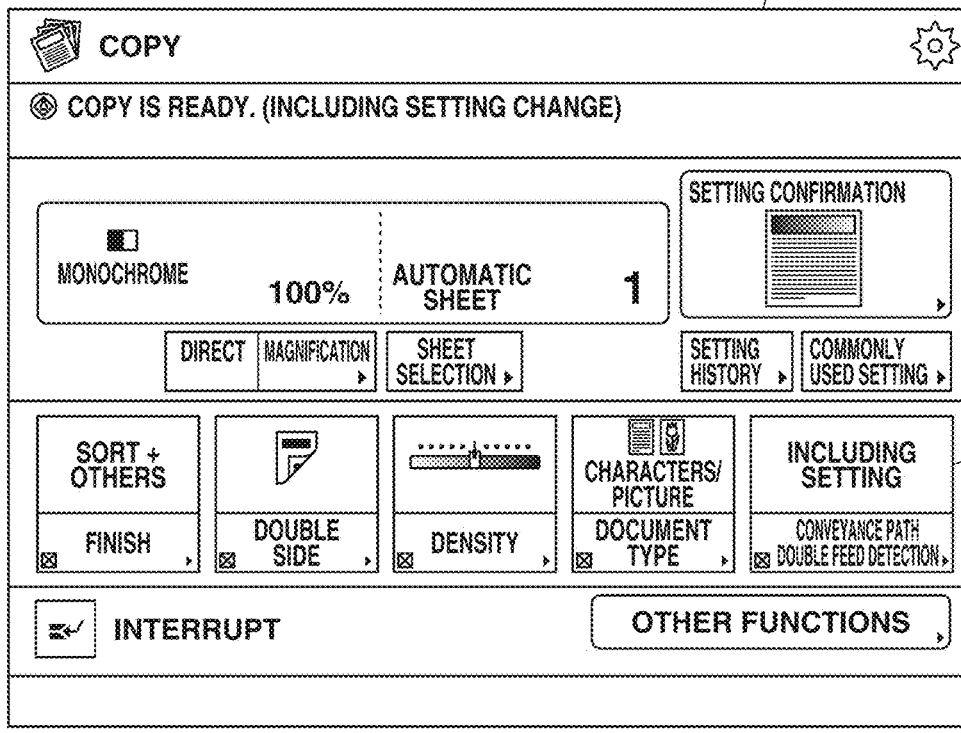
FIGS. 6A and 6B each illustrate an operation screen displayed on the panel 401.
Figure 6B:
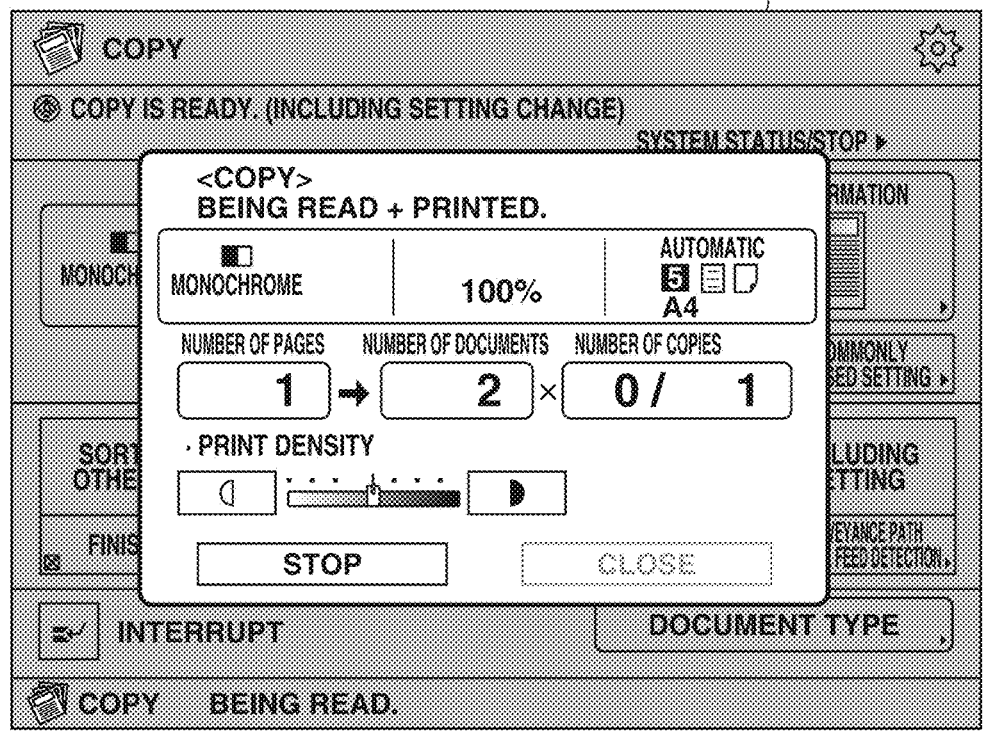

First, a copy setting will be described. FIGS. 6A and 6B illustrate an example of a copy screen displayed on the panel 401. FIG. 6A illustrates an example of a setting screen 601. FIG. 6B illustrates an example of a copy execution screen 603.

A user of the MFP 101 can select a copy function from a main screen (not illustrated) displayed on the panel 401. A button (icon) for selectively starting each of the various types of functions (e.g., a copy function, a file transmission function, and a file storage function) of the MFP 101 is displayed on the main screen.

The CPU 111 displays the setting screen 601 illustrated in FIG. 6A when the button for starting the copy function is pressed by the user with the main screen being displayed.

The user can perform various copy settings via the setting screen 601. For example, the user can set any number of copy related setting, including but not limited to the number of copies, switch between monochrome and color copying, and select two-sided copying. All of the possible available settings are not easily performed within the same screen. Accordingly, a plurality of functions is set by shifting to an individual setting screen for each of the setting items.

A double feed detection key 602 is a key for selecting whether a double feed detection function is set to "valid" (ON) or "invalid" (OFF). The user can switch whether the double feed detection function is set to "valid" or "invalid" using the double feed detection key 602. On the setting screen 601, a state where a double feed detection setting is set to "valid" is illustrated.

When the CPU 111 detects that the start key 412 has been pressed in a state where the setting screen 601 is displayed, the CPU 111 starts the copy processing. The CPU 111 starts a document reading operation by the reading unit 118 and displays the copy execution screen 603 illustrated in FIG. 6B on the panel 401.

A specific control method for displaying information for suppressing the reoccurrence of a double feed will be described below by using the copy processing as an example with reference to flowcharts illustrated in FIGS. 7 to 9.

Figure 8:
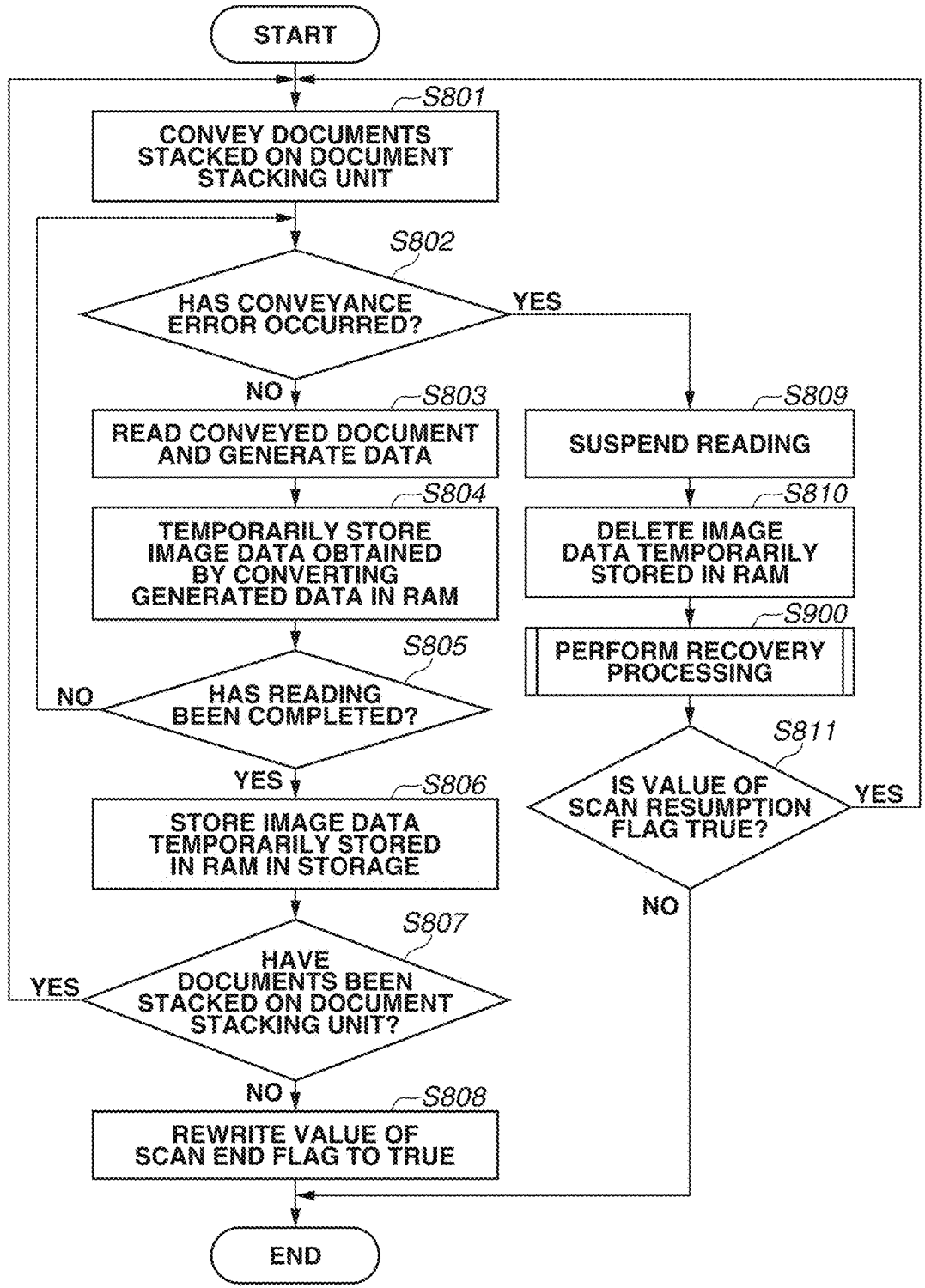
FIG. 8 is a flowchart illustrating a control method for controlling execution of copying.
Figure 9:
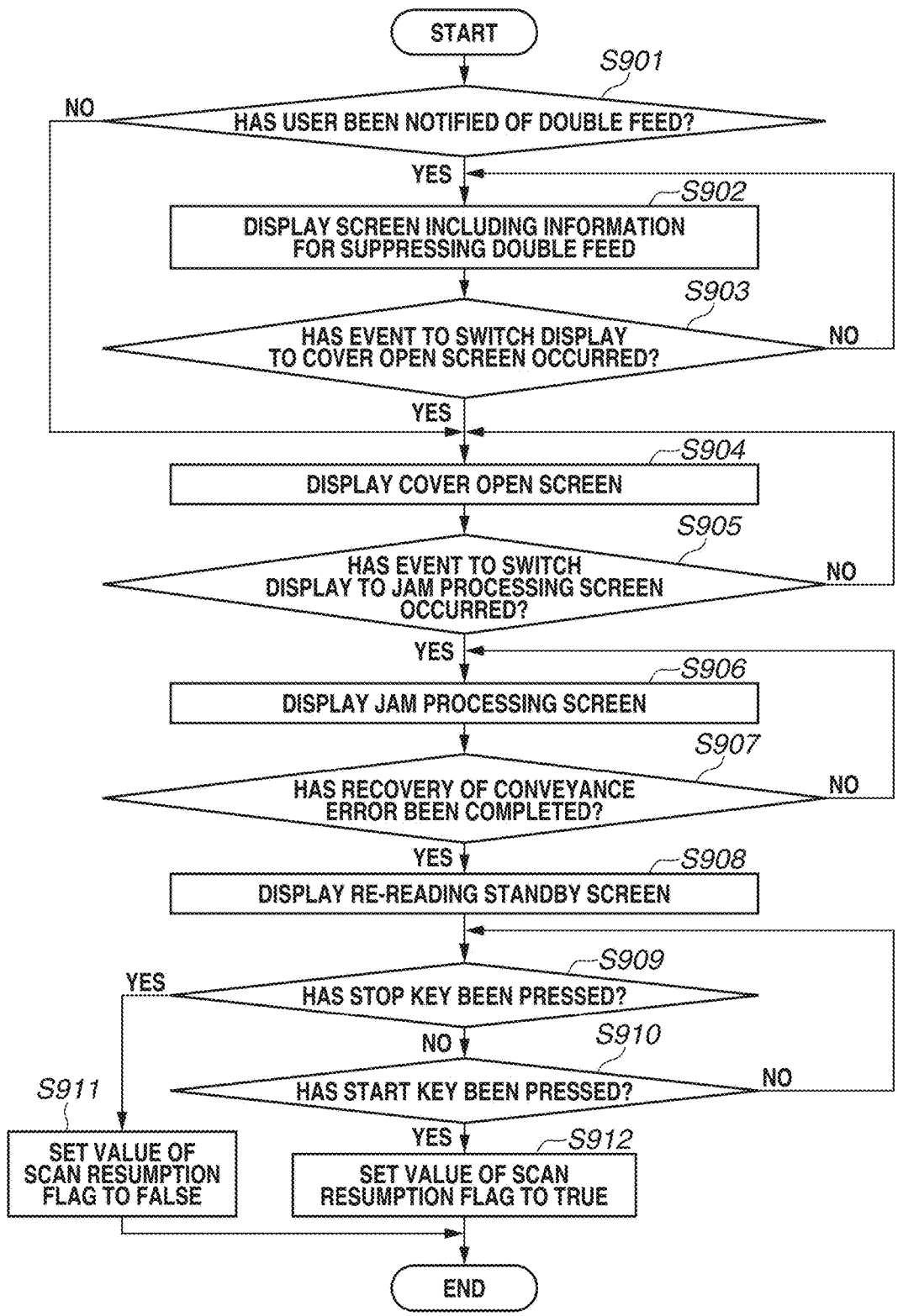
FIG. 9 is a flowchart illustrating a control method for controlling execution of copying.

Each of the operations (steps) illustrated in the flowcharts of FIGS. 7 to 9 is implemented when the CPU 111 reads out a control program stored in the ROM 112 or the storage 114 to the RAM 113 and executes the read control program. Some of the respective control programs for implementing the operations can be executed by another CPU (e.g., the CPU 131 in the reading unit 118) or executed in cooperation of the control programs.

In step S701, the CPU 111 determines whether an instruction to execute a copy job has been received. If the CPU 111 determines that the instruction to execute the copy job has been received (YES in step S701), the processing proceeds to step S702. On the other hand, if the CPU 111 determines that the instruction to execute the copy job has not been received (NO in step S701), the process in step S701 is repeated until the CPU 111 determines that the instruction to execute the copy job has been received. More specifically, the instruction to execute the copy job is received when the start key 412 is pressed by the user with the setting screen 601 illustrated in FIG. 6A, displayed on the panel 401. The CPU 111 displays the copy execution screen 603 on the panel 401 if the instruction to execute the copy job has been received.

In step S702, the CPU 111 sets (initializes) a value of a flag for indicating whether a series of processes relating to reading (scanning) of an image on the document 203 has normally ended (hereinafter, referred to as a scan end flag) to "FALSE". The value of the scan end flag is temporarily stored in the RAM 113.

A case where the value of the scan end flag is "TRUE" indicates that the scanning has normally ended. On the other hand, a case where the value of the scan end flag is "FALSE" indicates that the scanning has not normally ended. If, for example, an instruction to stop scanning has been received or if the execution of the copy job has been canceled, the CPU 111 determines that the scanning has not normally ended, and rewrites the value of the scan end flag to "FALSE". After the CPU 111 executes the process in step S702, the processing proceeds to step S800. In step S800, the CPU 111 executes the series of processes relating to scanning.

Next, details of the series of processes relating to scanning will be described with reference to the flowchart illustrated in FIG. 8.

In step S801, the CPU 111 controls the reading unit 118, to convey the document 203 stacked on the document stacking unit 202.

In step S802, the CPU 111 determines whether a conveyance error of the document 203, which have been conveyed in step S801, has occurred. The CPU 111 controls the reading unit 118 to acquire values such as an output value of the plurality of conveyance sensors 146 and the number of rotations of a driving motor. The CPU 111 then determines whether the document 203 has been remained (jammed) based on the acquired values. If the document 203 has been jammed, the CPU 111 determines that the conveyance error has occurred (YES in step S802), and the processing proceeds to step S809.

Further, the CPU 111 acquires an output value of the double feed detection sensor 149. If the double feed detection setting as the copy setting is set to ON and if the double feed detection sensor 149 has detected a double feed, the CPU 111 also determines that the conveyance error has occurred (YES in step S802), and the processing proceeds to step S809.

On the other hand, if the document 203 has not been jammed or if the double feed has not been detected (also including a case where the double feed detection setting is invalid), the CPU 111 determines that the conveyance error has not occurred (NO in step S802), and the processing proceeds to step S803.

If the double feed detection setting is invalid, the CPU 111 determines that the conveyance error has not occurred (NO in step S802) even if the double feed detection sensor 149 has detected the double feed, and the processing proceeds to step S803.

In step S803, to generate data, the CPU 111 controls the reading unit 118 to read the document 203 conveyed in step S801 while the document 203 is passing over the document glass 212. In step S804, the CPU 111 then controls the reading unit 118 to convert the data, which has been generated in step S803, into image data by the image processing unit 142. The CPU 111 controls the reading unit 118 to temporarily store the converted image data in the RAM 113.

In step S805, the CPU 111 controls the reading unit 118 to determine whether the reading of the document 203 has been completed. More specifically, if the CPU 111 determines that the reading of the document 203 has been completed (YES in step S805), when the conveyance sensor 146 detects a trailing edge of the document 203, i.e., the process of reading an image on the document and converting it into the image data has completed, the processing proceeds to step S806. On the other hand, if the document is being conveyed or the conversion into the image data is being performed, the CPU 111 determines that the reading of the document 203 has not been completed (NO in step S805), and the processing returns to step S802.

In step S806, the CPU 111 stores the image data temporally stored in the RAM 113 in step S804 in the storage 114. In step S807, the CPU 111 determines whether the documents 203 have been stacked on the document stacking unit 202. More specifically, the CPU 111 controls the reading unit 118 to acquire an output value of the document detection sensor 145. The CPU 111 determines whether the documents 203 are stacked on the document stacking unit 202 based on the acquired output value. If the CPU 111 determines that the documents 203 are stacked on the document stacking unit 202 (YES in step S807), the processing returns to step S801. In step S801, the CPU 111 reads the subsequent document 203. If the CPU 111 determines that the documents 203 are not stacked on the document stacking unit 202 (NO in step S807), the processing proceeds to step S808. In step S808, the CPU 111 rewrites the value of the scanning end flag stored in the RAM 113 to "TRUE", and the processing proceeds to step S703.

Next, the process performed when the conveyance error (the double feed and the jam) has occurred (YES in step S802) will be described. In step S809, the CPU 111 controls the reading unit 118 to suspend the scanning. The CPU 111 stops conveying the document 203 and reading the image on the document 203 due to suspension of the scanning and the processing proceeds to step S810.

In step S810, the CPU 111 deletes the image data temporally stored in the RAM 113 in step S804 and the processing proceeds to step S900. In step S900, the CPU 111 performs recovery processing for the conveyance error. In processes performed in step S900, the conveyance error is recovered, and a flag indicating whether scanning is resumed (hereinafter, referred to as a scan resumption flag) is set. A series of processes for the recovery processing will be described below with reference to the flowchart of FIG. 9.

In step S811, the CPU 111 refers to a value of the scan resumption flag, which was set by the series of recovery processes in step S900, and determines whether the value of the scan resumption flag is "TRUE". If the value of the scan resumption flag is "FALSE" (NO in step S811), the series of scan processes ends, and the processing proceeds to step S703 illustrated in FIG. 7. In this case, the CPU 111 closes a screen relating to recovery, and switches the screen to be displayed on the panel 401 to the copy execution screen (screen 603).

If the value of the scan resumption flag is "TRUE" (YES in step S811), the processing returns to step S801. In step S801, the CPU 111 performs processing for reading the document 203 re-stacked by the user. In this case, the CPU 111 closes the screen relating to the recovery, and switches the screen to be displayed on the panel 401 to the copy execution screen (screen 603).

In the process performed in step S811, if an instruction to stop scanning was issued in the recovery processing performed in step S900, the scan processing ends with the value of the scan end flag remaining "FALSE". Therefore, the copy processing can be stopped by processing described below.

Details of the recovery processing performed in S900 will be described below with reference to the flowchart of FIG. 9.

In step S901, the CPU 111 determines whether the user is notified of a double feed. More specifically, the CPU 111 acquires an output value of the double feed detection sensor 149. If the double feed detection setting is set to "valid" and if the double feed detection sensor 149 has detected the double feed in a copy operation (YES in step S901), the CPU 111 notifies the user via the panel 401 of a double feed detection result, and the processing proceeds to step S902. If the double feed detection setting is set to "invalid" or if the double feed detection sensor 149 has not detected the double feed in the copy operation (NO in step S901), the processing proceeds to step S904.

The process performed in step S901 is a process for performing control so that a screen for suppression of a double feed will not be displayed if the documents 203 have not double-fed or if the double feed detection setting is set to "invalid". If the double feed has not occurred in the process, work for the user to loosen the documents 203 can be reduced.

In step S902, the CPU 111 displays a screen including information for suppressing a double feed on the panel 401. More specifically, the CPU 111 displays the guide screen 504 on the panel 401 and the processing proceeds to step S903.

In step S903, the CPU 111 determines whether an event to switch the display to the cover open screen 508 has occurred. More specifically, if the CPU 111 determines that the "to subsequent procedure" key 507 has been pressed (YES in step S903), the processing proceeds to step S904. If the CPU 111 determines that the key 507 has not been pressed (NO in step S903), the processing returns to step S902.

In step S904, the CPU 111 displays the cover open screen 508 on the panel 401, and the processing proceeds to step S905. The CPU 111 updates, when it displays an animation or a moving image in the region 510, the region 510 to be displayed on the panel 401 at a predetermined interval (e.g., 30 frames per second (FPS).

In step S905, the CPU 111 determines whether an event to switch the display to the jam processing screen 511 has occurred. More specifically, if the "to subsequent procedure"

key 509 on the screen 508 has been pressed (YES in step S905), the processing proceeds to step S906. If the key 509 has not been pressed (NO in step S905), the processing returns to step S904. In step S904, the CPU 111 updates, as needed, the screen to be displayed on the panel 401. If the screen 508 does not include the key 509, and the opening/closing sensor (not illustrated) detects that the cover 250 has opened, the processing proceeds to step S906. Further, when either the key 509 is pressed or a case where the opening/closing sensor detects that the cover 250 has opened, the CPU 111 determines that the event to switch the display has occurred, and the processing proceeds to step S906.

In step S906, the CPU 111 displays the jam processing screen 511 on the panel 401, and the processing proceeds to step S907. The CPU 111 updates, when it displays an animation or a moving image in the region 512, the region 512 to be displayed on the panel 401 at a predetermined interval (e.g., 30 FPS). Information displayed in step S906 can be changed as needed. For example, the CPU 111 acquires the respective output values of the various types of sensors such as the document detection sensor 145, the conveyance sensors 146, and the double feed detection sensor 149. The CPU 111 estimates a position where a paper jam has occurred based on the acquired output values. The CPU 111 then displays a method for removing the document 203 based on the estimated position.

In step S907, the CPU 111 determines whether the recovery of the conveyance error has completed. More specifically, the CPU 111 controls the reading unit 118, to acquire respective output values of the plurality of conveyance sensors 146. If the CPU 111 determines that none of the conveyance sensors 146 detects the documents 203 based on the acquired values, the CPU 111 determines that the recovery has completed (YES in step S907), and the processing proceeds to step S908. If the CPU 111 determines that any one of the conveyance sensors 146 detects the documents 203 (NO in step S907), the processing returns to step S906. In step S906, the CPU 111 updates, as needed, the screen to be displayed on the panel 401.

In step S907, if the CPU 111 further detects, based on the opening/closing sensor (not illustrated), that the cover 250 has closed the CPU 111 determines that the recovery has completed (YES in step S907). In this case, if the CPU 111 determines that the conveyance sensor 146 does not detect the document 203 and if the CPU 111 detects, based on the opening/closing sensor (not illustrated), that the cover 250 has closed, the processing proceeds to step S908.

In step S908, the CPU 111 displays the rereading standby screen (screen 513) on the panel 401, and the processing proceeds to step S909. In step S909, the CPU 111 determines whether the stop key 515 has been pressed. If the stop key 515 has been pressed (YES in step S909), the processing proceeds to step S911. If the stop key 515 has not been pressed (NO in step S909), the processing proceeds to step S910.

In step S911, the CPU 111 sets the value of the scan resumption flag indicating whether reading (scanning) of the image on the document 203 is resumed to "FALSE", and ends the series of recovery processes. The scan resumption flag is a flag temporarily stored in the RAM 113. When the recovery processing is completed, the processing proceeds to step S811.

In step S910, the CPU 111 determines whether the start key 412 has been pressed. If the start key 412 has been pressed (YES in step S910), the processing proceeds to step S912. If the start key 412 has not been pressed (NO in step S910), the processing returns to step S909. In step S909, the CPU 111 waits until the start key 412 is pressed. In step S912, the CPU 111 sets the value of the scan resumption flag to "TRUE", and ends the series of recovery processes. When the recovery processing is completed, the processing proceeds to step S811.

If the scan processing is completed through the series of scan processes in step S800 and the series of recovery processes in step S900 performed when the conveyance error has occurred during the scan processing, the processing proceeds to step S703 in FIG. 7.

Returning to step S703, the CPU 111 refers to the value of the scan end flag, and determines whether the value of the scan end flag is "TRUE". If the CPU 111 determines that the value of the scan end flag is "TRUE" (YES in step S703), the processing proceeds to step S704. In step S704, the CPU 111 performs print processing. If the CPU 111 determines that the value of the scan end flag is "FALSE" (NO in step S703), the processing proceeds to step S705 after skipping step S704.

In step S704, the CPU 111 transfers the image data, which was stored in the storage 114 in step S806, to the printing unit 120. The CPU 111 controls the printing unit 120 to print the image data on a sheet. If the printing of the image data stored in the storage 114 is completed in step S806, the processing proceeds to step S705.

In step S705, the CPU 111 deletes the image data t stored in the storage 114 in step S806 and ends the copy processing.

The foregoing is the series of processes for receiving the instruction to execute the copy job and executing the received copy job in the MFP 101 according to the first exemplary embodiment.

While a case where the CPU 111 in step S902 displays information 505 prompting the user to loosen the documents 203, such as those stacked on the document stacking unit 202, as information for suppressing the reoccurrence of a double feed before the steps S904 to S907 processing for removing the documents 203 is exemplified in step S900, a timing at which the above-described information is displayed is not limited thereto. For example, the CPU 111 can display the information 505 prompting the user to loosen the documents 203 while the user is steps S904 to S907 executing the processing for removing the documents 203. Alternatively, the CPU 111 can display the information 505 prompting the user to loosen the documents 203 after the user has completed the processing for removing the documents 203. In this case, the CPU 111 executes the processes from steps S904 to S907, and then determines whether to notify the user of the double feed in step S901. If it is determined that the user should be notified of the double feed (YES at step S901), a rereading standby screen including the information 505 prompting the user to loosen the documents 203 is displayed in place of the screen 513 in step S908.

Figure 10:
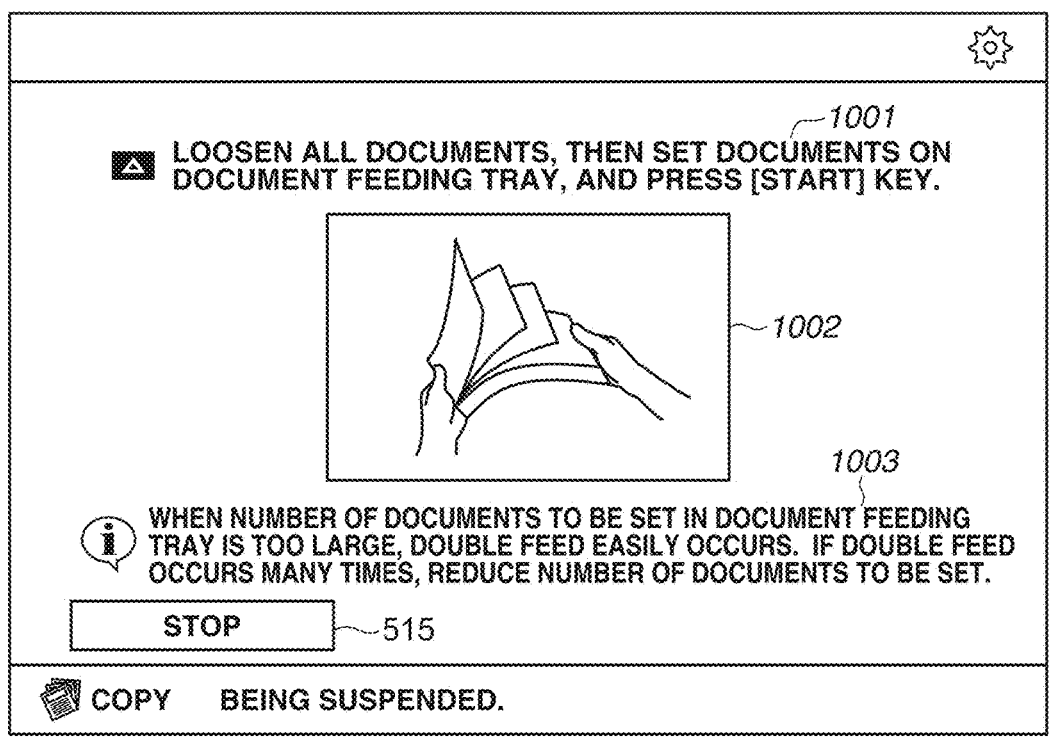
FIG. 10 illustrates an operation screen displayed on the panel 401.

FIG. 10 illustrates an example of a rereading screen displayed on the panel 401. Information 1001 notifies the user that a start key needs to be pressed after documents are loosened and then set. Information 1002 is an example of information prompting the user to loosen documents, and an illustration in an easy to understand manner for informing the user to loosen documents is displayed therein. Information 1003 is an example of information to be displayed in addition to information indicating that documents are to be loosened and information illustrating a way of loosening documents. In addition, information 1003 is also information notifying the user that a double feed can be suppressed when the number of the documents 203 to be set is reduced.

In this way, the CPU 111 displays the information prompting the user to loosen the documents 203 before the user makes a rereading instruction. The CPU 111 can present the information 1003 for suppressing the reoccurrence of the double feed to the user.

As described above, in the present exemplary embodiment, the processing can be carried on after the user has seen the information notifying the user that documents are to be loosened when the double feed has occurred. Further, in the present exemplary embodiment, the user is notified of the method for removing documents when the double feed has been detected. Therefore, the user can remove documents while confirming a method for opening the cover 250 and a method for removing documents that have been double-fed when the double feed has occurred.

Control is performed to determine whether the information prompting the user to loosen documents is presented to the user. For example, if the conveyance error has occurred but the double feed has not been detected, i.e., if the conveyance error is not due to the double feed, the maintenance screen for removing documents is displayed without the information prompting the user to loosen documents being displayed. Even if the double feed detection setting is set to "invalid", the maintenance screen for removing documents is also displayed without the information prompting the user to loosen documents being displayed. Therefore, if the information prompting the user to loosen documents is required, the information can be displayed.

Furthermore, in the present exemplary embodiment, the guide screen (the screen 504 displayed in step S902) can be previously displayed when the double feed has occurred. For example, work to be performed by the user (i.e., removal of documents and loosening of documents) is displayed on a screen first displayed when the double feed has occurred. Thus, the user can perform work to be performed until recovery after understanding the work. In addition thereto, control is performed to display the information prompting the user to loosen documents until the user explicitly presses the "to subsequent procedure" key 507. This processing can prevent the user from missing the information for prompting the user to loosen documents.

Another Embodiment

While the reading control in the copy function has been described in the first exemplary embodiment, aspects of the present invention are also applicable to other functions for reading documents. For example, aspects of the present invention are also applicable to a file transmission function for transmitting documents, which have been scanned by a MFP 101, to an external apparatus. Further, aspects of the present invention are also applicable to a storage function for storing documents, which have been scanned by the MFP 101, in a storage area from and to which documents are readable and writable by the MFP 101.

Furthermore, aspects of the present invention are also applicable to a case where a PC 102 issues a scan instruction to a scanner having a single function, causes the scanner to read documents, and stores scanned images in a storage area of the PC 102. In this case, a control program (e.g., a scanner driver) of the PC 102 and a reading control program for the scanner having a single function cooperate with each other to perform the above-described control. The scanner having a single function includes components required to read documents and exchange data with the PC 102 from among the components described in FIGS. 1 to 3. However, a shape and an appearance of a conveyance path for skimming documents can be changed as needed.

Figure 11:
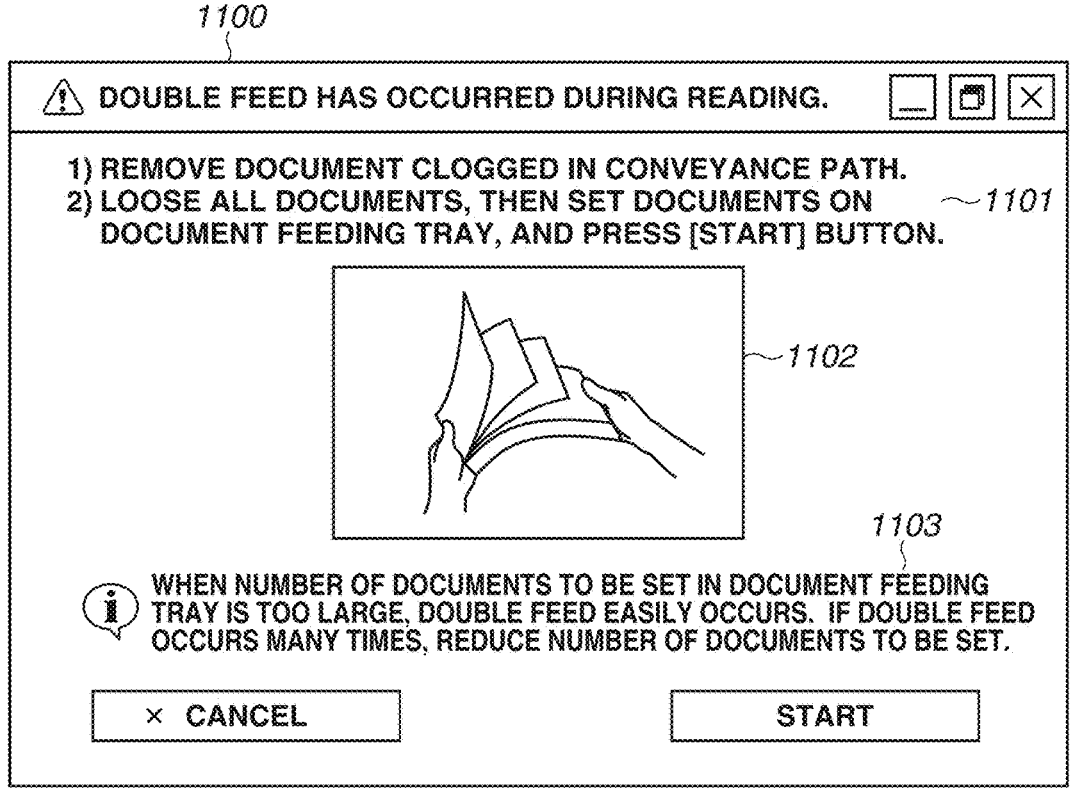
FIG. 11 illustrates a screen for issuing a notification prompting a user to loosen documents.

Furthermore, when the present exemplary embodiment is applied to the scanner having a single function, a display unit (not illustrated) in the PC 102 is notified of a double feed and a paper jam. For example, the PC 102 receives information, from the MFP 101, indicating that a double feed has occurred, and displays a screen relating to the paper jam and the double feed as illustrated in FIG. 11 on the display unit.

A screen 1100 illustrates an example of a window displayed on an operation unit in the PC 102. Information 1101 is information notifying a user that documents need to be removed and documents need to be loosened to suppress the reoccurrence of the double feed. Information 1102 is an example of information for suppressing the reoccurrence of the double feed, and uses an illustration for informing the user in an easy to understand manner to loosen documents. Information 1103 is an example of information displayed in addition to information indicating that documents are to be loosened and information illustrating a way of loosening documents, and is information notifying the user that the double feed can be suppressed when the number of documents to be set is reduced.

Thus, aspects of the present invention are applicable to an image reading apparatus that detects a double feed of documents and a system including such an image reading apparatus.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-135678, filed Jul. 6, 2015, which is hereby incorporated by reference herein in its entirety.

What is claimed is:

1. An image reading apparatus comprising:
   a document tray on which a plurality of documents is to be stacked;
   a feeder configured to feed a document of the plurality of documents on the document tray;
   a sensor unit configured to read an image on the document fed by the feeder;
   a detection sensor configured to detect whether a double feed of overlapping documents has occurred while the overlapping documents are conveyed by the feeder, wherein double feed refers to a state where two or more documents are fed with at least some parts thereof overlapping each other;
   a document sensor configured to detect an existence of a document being conveyed to determine jam of a document; and
   a controller configured to issue a notification,
   wherein, in a case where the detection sensor detects the double feed and the controller causes the feeder to stop conveying the moving overlapping documents before the overlapping documents are read by the sensor unit, the controller issues a first notification that instructs a user to loosen the overlapping documents by flipping each document of the overlapping documents and a second notification that instructs the user to remove documents remaining stopped in a conveyance path due to the controller causing the conveying roller to stop, and wherein, in a case where a document jam is detected in accordance with output of the document sensor, the controller issues the second notification and does not issue the first notification.

2. The image reading apparatus according to claim 1, wherein the controller displays, as part of the first notification, an illustration that instructs the user to loosen the overlapping documents.

3. The image reading apparatus according to claim 1, wherein the controller displays, as part of the first notification, a moving image that instructs the user to loosen the overlapping documents.

4. The image reading apparatus according to claim 1, wherein the first notification further informs the user that a double feed has occurred.

5. The image reading apparatus according to claim 1, wherein, the controller further displays, as part of the second notification, a notice prompting the user to remove, before refeeding the document of the plurality of documents on the document tray, a quantity of the documents stacked on the document tray.

6. The image reading apparatus according to claim 1, wherein the controller issues the first notification that instructs the user to loosen the overlapping documents before issuing information to resume feeding of the plurality of documents.

7. The image reading apparatus according to claim 1, wherein the controller causing the feeder to stop further includes the controller causing a conveying roller to stop, and
wherein, after the controller issues the first notification, the controller issues the second notification.

8. The image reading apparatus according to claim 1, further comprising a setting key configured to pre-set whether detection of the double feed by the detection sensor is set on or off,
wherein, when the detection of the double feed is set to be off by the setting key, the controller does not issue the first notification, even if the detection sensor has detected a double feed.

9. The image reading apparatus according to claim 1, further comprising a transmission interface configured to transmit information,
wherein, when the detection sensor detects the double feed of the documents, the transmission interface transmits information relating to an occurrence of the double feed to an information processing apparatus connected to the image reading apparatus.

10. The image reading apparatus according to claim 1, wherein the first notification instructs the user to loosen the plurality of documents that includes the overlapping documents recombined with documents remaining stacked on the document tray at the time of the double feed.

11. The image reading apparatus according to claim 1, wherein the instruction in the first notification for the user to loosen the overlapping documents is an instruction to affect an adhesive force imparted due to contact of one document with an adjacent document.

12. The image reading apparatus according to claim 11, wherein the adhesive force imparted due to contact of the one document to the adjacent document includes at least one of static electricity, a force resulting from the plurality of documents being left in a high-humidity environment, and a force imparted into a lower document from weight of documents above the lower document.

13. The image reading apparatus according to claim 1, wherein the feeder includes a document feeding roller paired with a separation member and the controller causes the document feeding roller to stop to cause the feeder to stop conveying the moving overlapping documents.

14. The image reading apparatus according to claim 1, wherein the first notification illustrates putting air between adjacent documents in the overlapping documents.

15. The image reading apparatus according to claim 1, wherein instruction in the first notification includes information illustrating how the user should hold the overlapping documents together, slightly warp the overlapping documents, and flip respective one ends of the overlapping documents to form a clearance between each document.

16. The image reading apparatus according to claim 1, wherein the controller performs control to display the first notification until a signal is received indicating that the user explicitly presses a key.

17. The image reading apparatus according to claim 1, wherein, in issuing the first notification, the controller causes the first notification to be displayed on an information processing apparatus.

18. The image reading apparatus according to claim 1, wherein, without the image reading apparatus determining information related to a cause of two or more documents being fed with at least some parts thereof overlapping each other, the controller issues the first notification.

19. A method for controlling an image reading apparatus having a document tray on which a plurality of documents is to be stacked and a sensor unit configured to read an image on the document fed by the feeder, the method comprising:
feeding, via a feeder, a document of the plurality of documents on the document tray;
detecting, via a detection sensor, whether a double feed of overlapping documents has occurred while the overlapping documents are conveyed by the feeder, wherein double feed refers to a state where two or more documents are fed with at least some parts thereof overlapping each other;
determining, via a document sensor configured to detect an existence of a document being conveyed, jam of a document; and
issuing, in a case where the detection sensor detects the double feed and the feeder being caused to stop conveying the moving overlapping documents before the overlapping documents are read by the sensor unit, a first notification that instructs a user to loosen the overlapping documents by flipping each document of the overlapping documents and a second notification that instructs the user to remove documents remaining stopped in a conveyance path due to causing the conveying roller to stop, and
issuing, in a case where a document jam is detected in accordance with output of the document sensor, the second notification and not the first notification.

20. An image reading apparatus comprising:
a document tray on which a plurality of documents is to be stacked;
a feeder configured to feed a document of the plurality of documents on the document tray;
a sensor unit configured to read an image on the document fed by the feeder;
a detection sensor configured to detect whether a double feed of overlapping documents has occurred while the overlapping documents are conveyed by the feeder, wherein double feed refers to a state where two or more documents are fed with at least some parts thereof overlapping each other; and
a controller configured to issue a notification, wherein, in a case where the detection sensor detects the double feed and the controller causes the feeder to stop conveying the moving overlapping documents before the overlapping documents are read by the sensor unit, the controller issues a first notification that instructs a user to loosen the overlapping documents, wherein, to prevent the user from missing the displayed first notification that instructs the user to loosen the overlapping documents, the controller issues a second notification after receiving acknowledgement that the user acknowledges the displayed first notification that instructs the user to loosen the overlapping documents, and wherein the second notification is displayed on a panel in place of the first notification and instructs the user to remove the overlapping documents from a conveyance path monitored by the detection sensor.

21. The image reading apparatus according to claim 20 further comprising the panel.

22. An image reading apparatus comprising:
a document tray on which a plurality of documents is to be stacked;
a feeder configured to feed a document of the plurality of documents on the document tray;
a sensor unit configured to read an image on the document fed by the feeder;
a detection sensor configured to detect whether a double feed of overlapping documents has occurred while the overlapping documents are conveyed by the feeder, wherein double feed refers to a state where two or more documents are fed with at least some parts thereof overlapping each other;
a document sensor configured to detect an existence of a document being conveyed to determine jam of a document; and
a controller configured to issue a notification,
wherein, in a case where the detection sensor detects the double feed, the controller causes the feeder to stop conveying the moving overlapping documents before the overlapping documents are read by the sensor unit and issues a first notification that instructs a user to loosen the overlapping documents and a second notification that instructs the user to remove documents remaining stopped in a conveyance path due to the controller causing the conveying roller to stop,
wherein, in a case where a document jam is detected in accordance with output of the document sensor, the controller issues the second notification and does not issue the first notification,
wherein, in a case where, after the controller issues the first notification, the controller (i) detects no document in a conveyance path and (ii) detects that a cover for covering the conveyance path has been closed from an open position, the controller issue a third notification having information notifying the user that instructs the user to reset the plurality of documents on the document tray and to press a start key, and
wherein, in response to the start key receiving instructions from the user after the controller issues the third notification, a document reset on the document tray is fed by the feeder and the sensor unit reads an image on the document fed by the feeder.

23. An imaging forming apparatus comprising:
a printing unit configured to form an image on a document based on data read by an image reading apparatus; and
the image reading apparatus, wherein the image reading apparatus includes:

a document tray on which a plurality of documents is to be stacked,
a feeder configured to feed a document of the plurality of documents on the document tray,
a sensor unit configured to read an image on the document fed by the feeder,
a detection sensor configured to detect whether a double feed of overlapping documents has occurred while the overlapping documents are conveyed by the feeder, wherein double feed refers to a state where two or more documents are fed with at least some parts thereof overlapping each other,
a document sensor configured to detect an existence of a document being conveyed to determine jam of a document, and
a controller configured to issue a notification,
wherein, in a case where the detection sensor detects the double feed and the controller causes the feeder to stop conveying the moving overlapping documents before the overlapping documents are read by the sensor unit, the controller issues a first notification that instructs a user to loosen the overlapping documents by flipping each document of the overlapping documents and a second notification that instructs the user to remove documents remaining stopped in a conveyance path due to the controller causing the conveying roller to stop, and
wherein, in a case where a document jam is detected in accordance with output of the document sensor, the controller issues the second notification and does not issue the first notification.

24. An image reading apparatus comprising:
a document tray on which a plurality of documents is to be stacked;
a feeder configured to feed a document of the plurality of documents on the document tray;
a sensor unit configured to read an image on the document fed by the feeder;
a detection sensor configured to detect whether a double feed of overlapping documents has occurred while the overlapping documents are conveyed by the feeder, wherein double feed refers to a state where two or more documents are fed with at least some parts thereof overlapping each other; and
a controller configured to issue a notification,
wherein, in a case where the detection sensor detects the double feed, the controller causes the feeder to stop conveying the moving overlapping documents before the overlapping documents are read by the sensor unit and issues a notification that instructs a user to loosen the overlapping documents,
wherein, in a case where, after the controller issues the notification that instructs the user to loosen the overlapping documents, the controller (i) detects no document in a conveyance path and (ii) detects that a cover for covering the conveyance path has been closed from an open position, the controller issue a notification having information notifying the user that processing can be resumed after the user resets the plurality of documents on the document tray and presses a start key, and
wherein, in response to the start key receiving instructions from the user after the controller issues the notification having information notifying the user that processing can be resumed, the document reset on the document tray is fed by the feeder and the sensor unit reads an image on the document fed by the feeder.

\* \* \* \* \*